(12) United States Patent
Wood

(10) Patent No.: US 6,195,035 B1
(45) Date of Patent: Feb. 27, 2001

(54) CYLINDRICAL MONOPULSE

(75) Inventor: Joseph R. Wood, Lawrence, MA (US)

(73) Assignee: Textron Systems Corporation, Wilmington, MA (US)

( * ) Notice: Subject to any disclaimer, the term of this patent is extended or adjusted under 35 U.S.C. 154(b) by 0 days.

(21) Appl. No.: 06/660,199

(22) Filed: Oct. 12, 1984

(51) Int. Cl.[7] .................................................. G01S 13/72
(52) U.S. Cl. ....................... 342/80; 342/67; 342/149; 342/152; 342/153; 342/194; 342/97
(58) Field of Search .................. 343/76, 16 M, 343/700 MS, 729, 908, 777; 342/67, 153, 62, 80, 90, 96, 97, 149, 151, 152, 194

(56) References Cited

U.S. PATENT DOCUMENTS

| | | | |
|---|---|---|---|
| 2,845,622 | * 7/1958 | Gamble | 343/16 M |
| 3,701,158 | * 10/1972 | Johnson | 343/16 M |
| 4,041,499 | * 8/1977 | Liu et al. | 343/777 X |
| 4,148,026 | * 4/1979 | Gendreu | 343/16 M |
| 4,318,107 | * 3/1982 | Pierrot et al. | 343/700 MS |
| 4,649,391 | * 3/1987 | Tsuda et al. | 342/153 |
| 5,184,136 | * 2/1993 | Cardiasmenos | 342/153 |
| 5,467,682 | * 11/1995 | Brooks | 89/41.22 |

FOREIGN PATENT DOCUMENTS

| | | | |
|---|---|---|---|
| 2393322A | * 2/1979 | (FR) | G01S/7/00 |
| 2110035A | * 6/1983 | (GB) | G01S/13/66 |
| 2135131 | * 8/1984 | (GB) | 343/16 M |
| 1605291A | * 4/1988 | (GB) | G01S/7/28 |
| 2250153A | * 5/1992 | (GB) | G01S/3/18 |

OTHER PUBLICATIONS

Durkin et al, *35 GHZ Active Aperture*, Jun. 1981, pp 425–427 1981 IEEE Mits–S Inter. Microwave Symposium Digest; LA, Cal. USA.*

* cited by examiner

Primary Examiner—John B. Sotomayor
(74) Attorney, Agent, or Firm—Lesley A. Hamlin (57) ABSTRACT

A monopulse antenna system comprising an inner antenna and an outer antenna disposed symmetrically about a central axis of symmetry. A central aperture is located at the axis of symmetry through which a weapon system may fire or an additional sensor may be located. The inner antenna is preferably annular in shape and produces a relatively broad antenna pattern. The outer antenna is also preferably annular and produces a beam pattern with many lobes. The received signals A and B, from each beam pattern, are combined in a hybrid to produce sum signals (A+B) and difference signals (A−B), which are then processed to produce a target off-axis radius relative to the antenna main beam axis, i.e., the axis of symmetry.

12 Claims, 10 Drawing Sheets

CYLINDRICAL MONOPULSE

This application describes an invention made or partially made in the course of work under a U.S. Government contract, viz Contract No. DAAK10-82-C-0176. A confirmatory license has been granted to the U.S. Government to utilize the invention for Government purposes.

TECHNICAL FIELD

This invention is in the field of monopulse tracking systems and, particularly, radar systems.

BACKGROUND ART

The term "monopulse" refers, in general, to radar tracking techniques which derive target angle-error information on the basis of a single pulse. An amplitude-comparison monopulse tracking system utilizes radio frequency (RF) signals derived from two radar beams, A and B, which are "squinted" or off-set about the axis of symmetry of a pair of radar antenna feeds. Thus, a target which is not on the axis of symmetry, will receive pulsed or continuous wave (C-W) RF energy signals from the radar antenna feeds of different amplitudes, depending upon the off-axis location of the target. This phenomena is used to develop an error signal which can be used to track the target.

The return signal is received simultaneously at both antenna feeds and a sum or reference signal (A+B) and a difference signal (A−B) is produced at the output arms of a hybrid junction device. The difference signal (A−B), when compared to the reference signal (A+B), provides an angular error signal proportional to the off-axis direction of the target.

In a conventional amplitude-comparison monopulse system, a cluster of four antenna feeds or horns, divide a primary beam into 4 subapertures which produce two pairs of beams, one pair of which is squinted horizontally and the other, vertically, to produce two-dimensional angular error signals. (See *Introduction to Radar Systems* by M. I. Skolnik, 1962, pp 175–184 and *Phase-Amplitude Monopulse System*, W. Hausz et al., 1962, IEEE, for a more complete description.) The four antenna horns are disposed about a central axis and form four quadrants; two above the horizontal axis and two below.

Phase comparison monopulse operates on a similar principle except that the orthogonal beams are produced by subdividing a primary beam at four subapertures to produce two beams in each orthogonal plane having identical amplitude versus angle response. Thus, the amplitude of the return signal from an off-axis target will be the same at each subaperture but the time of arrival will be different, producing phase difference signals (A−B) and (C−D), which can be used for tracking purposes when compared to reference signals (A+B) and (C+D).

Such conventional monopulse systems typically operate in a cartesian coordinate system in which an elevation error signal is generated from a determination of the position of the target off the Y-axis and the azimuth error signal is generated by a determination of the position of the target off the X-axis. In such systems, the monopulse antenna is driven in elevation by an elevation gimble and in azimuth by an azimuth gimble. To determine the elevation gimble error signal, the sum and difference of the return signal from the two quadrants above and the two quadrants below the horizontal or X-axis is needed. Similarly, to determine the azimuth gimble signal, the sum and difference of the two quadrants on either side of the vertical or Y-axis is needed.

Conventional cartesian coordinate monopulse systems, as described above, require a fairly complex antenna feed network of four antenna subapertures combined with four hybrids to produce the required four sum and difference signals. Furthermore, the four subapertures are located symmetrically at and about the axis of symmetry preventing location of an additional sensor, such as an IR detector, at this location, or use of a weapon system boresighted with the axis of symmetry.

Accordingly, a need exists for a less complex monopulse antenna structure and one which will permit location of additional sensors or weapons at the beam axis of symmetry or collimated to the beam axis of symmetry.

DISCLOSURE OF THE INVENTION

In accordance with the present invention, a monopulse antenna system is provided which utilizes a cylindrical coordinate system and comprises an inner antenna and an outer antenna disposed symmetrically about a central axis of symmetry. The cylindrical coordinates are range (R) from the antenna and radius (r) from the beam center. A central aperture in the inner antenna, located at the axis of symmetry, provides a convenient opening through which a weapon system may fire or in which an additional sensor may be located.

The inner antenna produces a relatively broad antenna pattern while the outer antenna produces a beam pattern with many lobes. The received signals A and B, from each beam pattern, are combined in a single hybrid to produce sum signals (A+B) and difference signals (A−B), which are then processed to produce a target off-axis radius relative to the antenna main beam axis, i.e, the axis of symmetry.

In a specific embodiment of the invention, the inner and outer antennas are planar and annular in shape and are located in the same plane concentric to each other. Such an annular monopulse antenna of the invention is utilized to provide radial discrimination, such that targets which are off-axis by more than a predetermined radial distance from the weapon system boresight are ignored and targets which are within the predetermined radial distance are further processed.

The present monopulse system of the invention is greatly simplified as contrasted to conventional monopulse systems in that the error signals do not have to provide azimuth or elevational information or right/left, up/down information but merely radial distance from the center of the beam or from a reference point in the beam. In a preferred embodiment, this reference point is a null point in the beam pattern formed at the point where the sum of the beam inner and outer antenna patterns (A+B) and the difference of such patterns (A−B) are equal in amplitude. The radial distance, measured on the + or − side of this null, can be used to provide a threshold signal signifying when a target is entering a predetermined weapon engagement zone.

BEST MODE OF CARRYING OUT THE INVENTION

System Description

Figure 1:
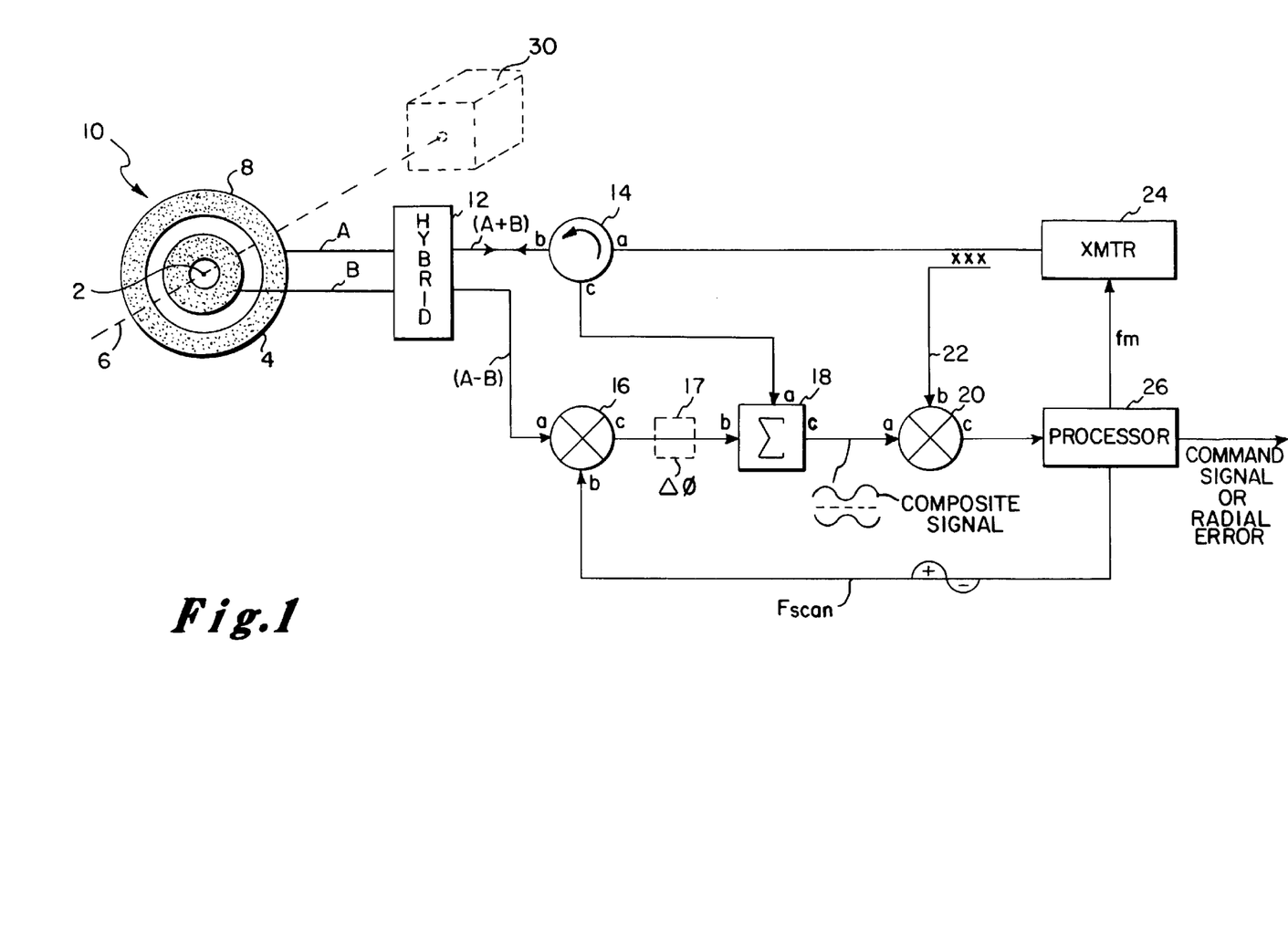
FIG. 1 is a block diagram of a monopulse system in accordance with the invention.

An FM/CW homodyne monopulse system, in accordance with the invention, is shown in block diagram form in FIG. 1. As may be seen in FIG. 1, the monopulse antenna 10 of the preferred embodiment of the invention comprises an inner annular antenna 4 and an outer annular antenna 8 disposed concentric to each other about a central axis of symmetry 6 (shown in dotted lines). Central aperture 2 in inner annular antenna 4 provides an opening through which a weapon system or an additional sensor may optionally be located at the axis of symmetry or bore sight. The weapon system or additional sensor is shown in dotted lines at 30.

Transmitter 24 generates an RF signal which is simultaneously coupled to the inner and outer annuli 4 and 8 of the antenna 10 via a duplexer 14 and hybrid 12. Duplexer 14 may comprise a circulator, hybrid coupler or a branchline coupler or similar unidirectional coupling device. A portion of the transmitted power is also coupled via microstrip coupler 22 to port "b" of mixer 20 to form the local oscillator signal for the mixer.

From the duplexer 14 the transmitted signal is fed to the sum port (A+B) of a microstrip (rat race) hybrid 12. Signals entering the sum port are coupled by the hybrid equally in power and in phase to the outer annulus 8 and inner annulus 4.

Figure 6:
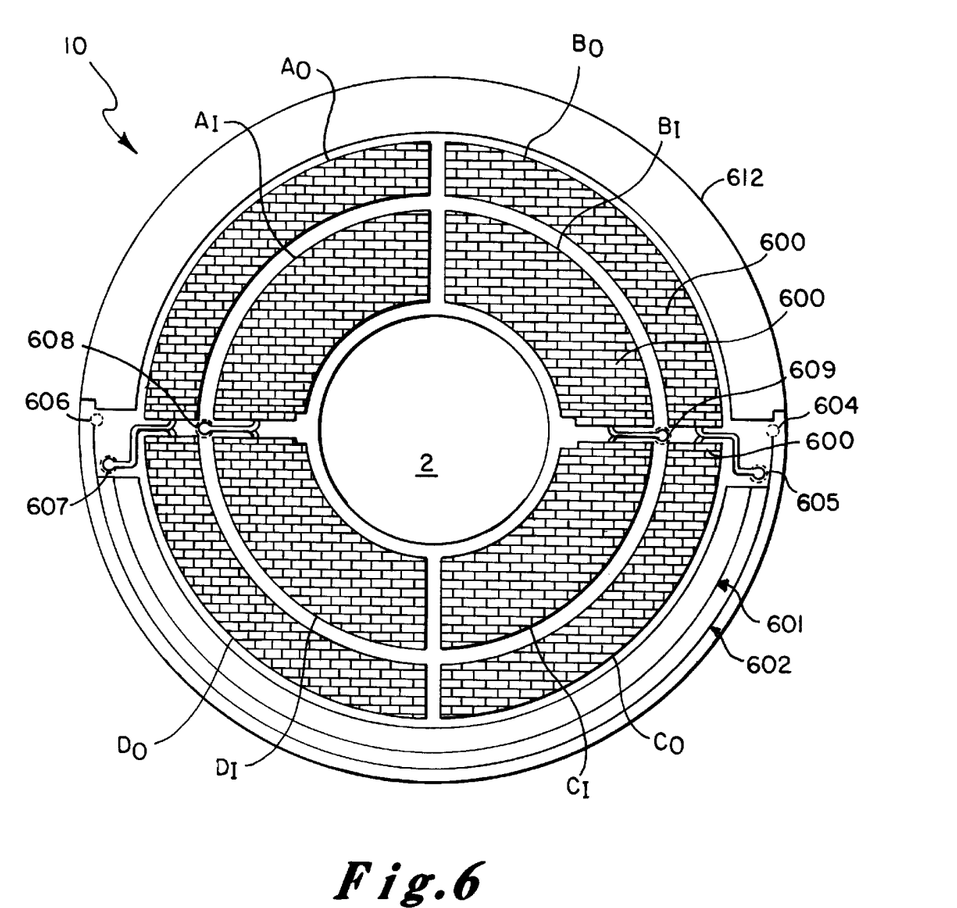
FIG. 6 is a front view of an antenna embodiment of the invention and FIG. 6A is a side view of the antenna.

The inner and outer annulus may be physically formed in four quadrants of a plurality of individual planar feed elements/radiating elements arranged as shown in FIG. 6; which radiate a beam pattern as will be described in connection with FIGS. 2 and 3. Received power from a target or terrain in the far field illuminates the inner and outer annulus with substantially equal intensity (power density) because of the symmetry of the annuli and the small dimensions of the total array aperture with respect to the far field range from the array. The vector sum (A+B) of the outer annulus return signal A and the inner annulus return signal B is formed in hybrid 12 and coupled out the sum port to receive port "b" of duplexer 14 where it is circulated to port "c" and coupled to port "a" of hybrid summing junction 18.

The vector difference (A−B) of the outer annulus return signal A and the inner annulus return signal B is formed in hybrid 12 and coupled out the difference delta port to port "a" of double balanced modulator 16. Modulator 16 is driven by a sinusoidal scanning frequency signal $F_{scan}$ from processor 26 introduced at port "b". As the $F_{scan}$ sinusoid goes through the positive (+) portion of its cycle, the output of the modulator at port "c" is the (A−B) signal multiplied by the plus voltage. When $F_{scan}$ swings through its negative half cycle, the (A−B) input signal is multiplied by a minus voltage and the output during this half cycle is (B−A).

The scan-modulated difference signal $[(A-B)*F_{scan}]$ is fed from output port "C" of modulator 16 through manual phase shifter (17) and applied to port "b" of monopulse summer (18). The manual phase shifter (shown in dotted lines) is used to establish the initial carrier phase relationships between sum (A+B) and difference (A−B) carriers and to accommodate replacement of components which might affect this phase relationship. The desired phase relationships are illustrated in FIG. 3, which will be discussed in detail later. The signal return from a target at boresight produces, at the output ports of the monopulse hybrid 12, a sum (A+B) signal and a difference (A−B) signal which have carriers in phase with each other. These signals travel back to the monopulse summer (18) through different paths and processes. The path delays must be so designed as to be nearly identical to preserve system bandwidth. That is, the path of (A+B) from the output of the hybrid 12 through the duplexing circulator (14, "b" to "c") to monopulse summer (18, "a") must be identical in length to the path (A−B) from the output of the hybrid 12 through the scan modulator (16, "a" to "c"), the manual phase shifter 17 and to the monopulse summer (18, b). The manual phase shifter 17 is adjusted so that with a positive $F_{scan}$ input, the sum (A+B) and the difference (A−B), developed from a radar return from a target located on the antenna boresight axis and applied to the respective terminals of monopulse summer 18 via the respective conductive path elements and processes indicated on FIG. 1, add vectorially within the summer 18 to produce a peak carrier voltage at the summer output (18 "c") equal to the sum of the peak input carrier voltages and a carrier phase angle identically equal to that of both input signals.

Figure 3:
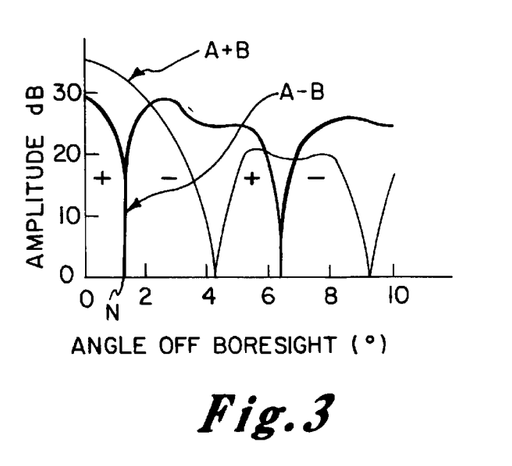
FIG. 3 is a plot of the amplitude of the sum and difference signals at far field versus angle.
Figure 4:
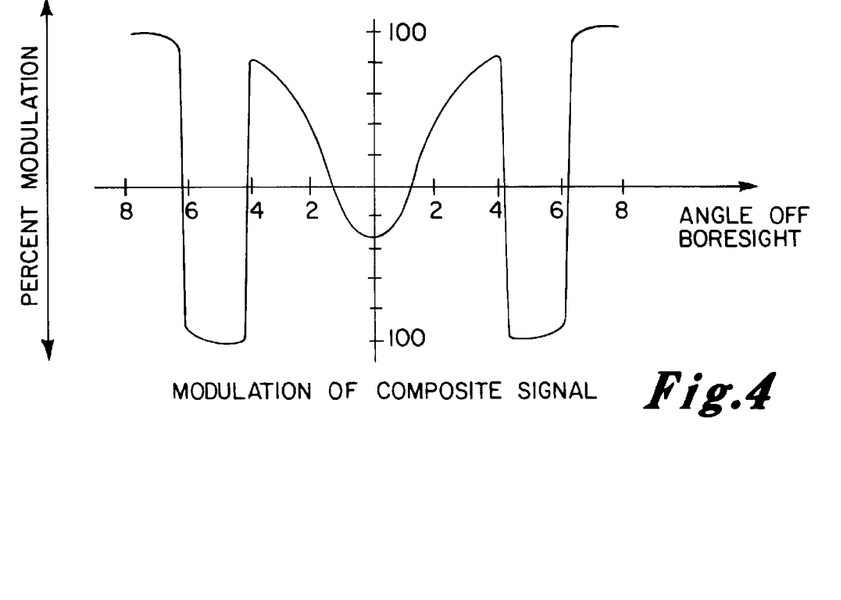
FIG. 4 is a plot of the amplitude modulation versus angle.

The function of the manual phase shifter may be better understood by referring to FIGS. 3 and 4 and the curve labelled composite signal in FIG. 1. This phase relationship between the input signals to summer 20 is indicated, in FIG. 3, by the plus and minus signs under the difference pattern plotted between boresight and the difference null location (n). The relationship is also shown in FIG. 1 by the peak of the amplitude modulation of the scan frequency ($F_s$) on the composite signal applied to the mixer 20 and by the magnitude of the modulation index of the amplitude modulation plotted on FIG. 4 for the respective positions, with respect to boresight, of the target. The volley of the amplitude modulation at the scan frequency on the composite signal applied to the mixer 20 is generated when the scan frequency swings negative, inverting the phase of the difference signal applied to the monopulse summer 18, thus creating a composite signal with carrier amplitude equal to the difference of the sum carrier amplitude minus the difference carrier amplitude. In summary, therefore, the particular utilization of the cylindrical monopulse signals indicated on FIG. 1 depends on the generation of a suppressed carrier amplitude modulated difference (A−B) signal at the output of the scan modulator 18 with carrier phase alternating at the half cycles of the scan frequency $F_s$ and with carrier phase adjusted (phase shifter 17) to be in phase with and out of phase from the carrier of the sum (A+B) signal, as applied to the monopulse summer 18, on these alternate half cycles.

The RF carrier signal into receiver port "a" of mixer 20 is an amplitude modulated wave at the scanning frequency $F_{scan}$ with the magnitude of the amplitude proportional to the magnitude of the radius from a beam reference null and the phase (+ or –) of the amplitude modulation envelope indicative of which side of the null reference the target is located. This carrier signal is beat in mixer 20 with a local oscillator signal comprising a portion of the transmitter power coupled by stripline coupler 22 from XMTR 24. The baseband output signal at port "c" of mixer 20 consists of doppler, range components and amplitude modulated (AM) monopulse information.

In general, processor 26 separates the range and doppler information and demodulates the AM modulation on the carrier. Based on the range information, the processor 26 generates a modulation frequency signal FM to be applied to transmitter 24 to position the monopulse AM information in an appropriate range gate within the processor. The AM monopulse information is detected to produce a monopulse error signal and its phase compared with a reference signal (F-scan). If the monopulse information is in-phase with the reference, the target is within the area of interest and a command signal is generated to activate the weapon system. An out-of-phase condition indicates that the target is beyond the radius of interest, in which case, no command signal is generated.

Antenna Patterns

The antenna space patterns (FIG. 2) are used to generate sum and difference monopulse patterns (FIG. 3). In FIG. 2, the amplitude in decibels is plotted in the abscissa (Y-axis) and the angle-off bore sight in degrees is plotted in the ordinate (X-axis). These patterns will now be described in detail.

Figure 2:
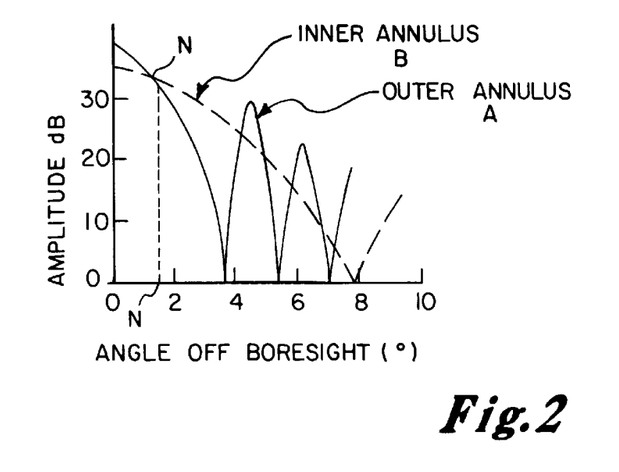
FIG. 2 is a plot of the amplitude of the inner and outer beams at far field versus angle.

The inner annular antenna 4 produces a relatively broad far field antenna pattern plotted in FIG. 2 curve B in dotted lines. The far field beam pattern of the outer annular antenna 8 is shown in curve A in solid lines to result in a beam pattern with many lobes. The sum (A+B) of the inner annular and outer annular signals is obtained at one branch of a conventional hybrid junction 12 and the difference (A–B) or "delta" signal is obtained at a second branch of hybrid junction 12. Note that the A and B notations refer to vector signals in the carrier frequency domain and rules for vector arithmetic must be followed in summing the signals.

The patterns of the sum and difference signals are plotted in FIG. 3 and may be seen to produce a difference pattern that is very narrow, i.e., only about 1.2 degrees between nulls. This allows for a very narrow radial discrimination. FIG. 3 shows the vector sum (curve A+B) and vector difference (curve A–B) of the outer annulus and inner annulus return signals in decibels. These return signals are the respective outputs of hybrid 12. As may be seen by comparing FIG. 2 and FIG. 3, when the return signal from the inner annulus and outer annulus is equal in amplitude (Point N FIG. 2) and the two are subtracted, a null occurs as shown in FIG. 3 (Point N).

The percent modulation versus angle off boresight of the composite AM signal is shown in FIG. 4. The composite signal is orbitarily illustrated as negative from a little over 6° off boresight to about 4.2° off boresight at which time an abrupt transition to a positive magnitude occurs.

Antenna

Figure 6A:
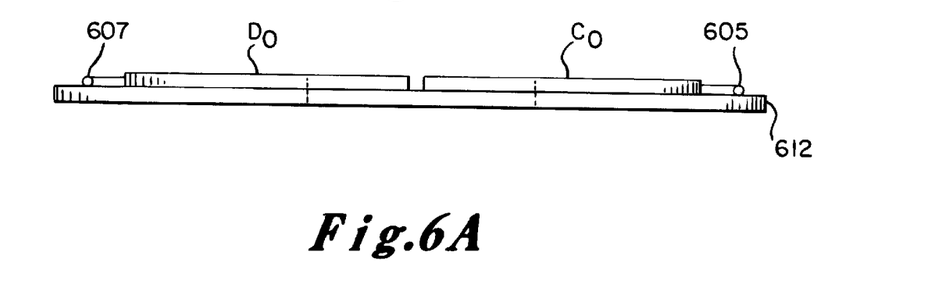

Referring now to FIGS. 6 and 6A, the details of the antenna 10 of FIG. 1 will be further explained. Antenna 10 consists of a planar support board 612, preferably made of a Teflon™/fiberglass laminate to which is affixed various microstrip elements.

TM—TEFLON is a registered trademark of the E. I. duPont Co.

A clearance hole 2 for a boresighted weapon or other sensor is provided through the center of the antenna 10. An inner antenna annulus indicated by the quadrants labelled AI, BI, CI, and DI is formed of a plurality of combined radiating elements/feed elements formed of microstrip conductors 600. The outer annulus is also formed of microstrip radiating elements/feed elements 600 which comprise an antenna array of four quadrants labelled AO, BO, CO and DO.

Figure 5:
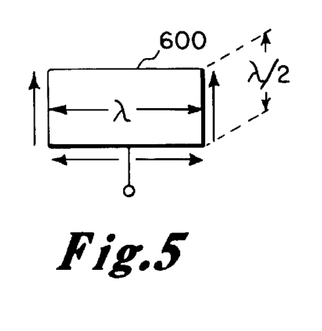
FIG. 5 is a schematic view of the individual feed and radiating elements 600 of FIG. 6.

As shown in FIG. 5, the radiating elements are microstrip conductors separated by one wavelength horizontally and by a half wavelength in the vertical dimension of FIG. 6. The elements form a travelling wave antenna with a one point feed in each quadrant. The RF wave propagates across the quadrants, BI or CI, from feed point 609 indicated in the horizontal gap between BI and CI. Feed point 608 couples the RF wave to quadrants AI and DI. The feeds 608 and 609 for the left and right inner quadrants are coupled to respective terminals 604 and 606 which are joined by microstrip feed wire 602. Similarly, feed points 605 and 607 for the outer annulus quadrants AO, BO, CO and DO are coupled together by microstrip line 601. These two feed lines 601 and 602 are then coupled to the hybrid 12 (FIG. 1).

For the antenna structure of FIG. 6, the reference null point is located at about 1.8° off-boresight axis, as shown in FIG. 3. The null point depends on the dimensions of the inner and outer annuli and can be tailored for specific applications. Referring back to the plot of FIG. 2, further explanation of the details thereof will be given. FIG. 2 is a plot of beam amplitude measured at the far field of the antenna beam pattern of the inner annulus 4 and outer annulus 8. The inner annulus has a broad, well-defined beam because it has a nearly continuous aperture with a relatively small inner opening 2. Opening 2 represents a small percentage of the total inner annulus aperture defined by the outer periphery of the inner annulus.

As may be seen, the first null point of the inner annulus beam pattern does not occur until 8° off boresight in two dimensions. Beam null points occur when the main beam lobe overlaps a side lobe such that the two lobes are out of phase and the amplitudes are such as to cancel each other producing a null or interferometer effect.

The outer annulus produces a more pronounced interferometer effect, as shown in FIG. 2, since many side lobes occur close to the antenna. The width of the beam of the inner annulus is a fraction of $\lambda/D$ wherein $\lambda$ is the wavelength of the radiation and D is the total diameter of the annulus. The sidelobes are a function of the difference between the internal lobe 2 and the outer diameter D.

Specific Processor Embodiment

Figure 9:
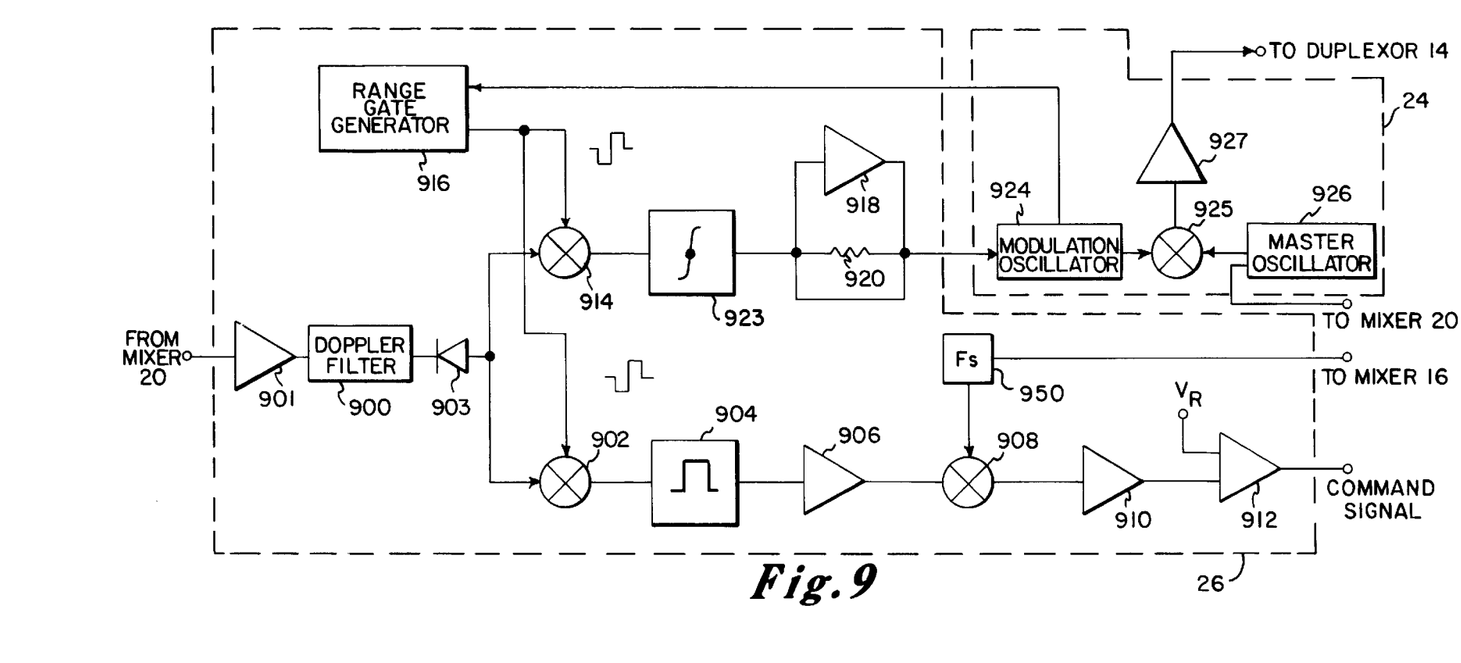
FIG. 9 is a detailed schematic of the processor 26 and transmitter 24 of FIG. 1.

Referring now to FIG. 9, a specific embodiment of a processor, in accordance with the invention, will be described. In the processor 26, the IF must be doppler filtered and range gated to select the proper signal for demodulation of the monopulse error information. Thus, the IF signal from mixer 20, which contains the monopulse error information in the form of amplitude modulation, is first amplified in amplifier 901 and doppler filtered in filter 900 which selects a predetermined frequency band for further processing. For example, targets having a velocity within a certain coarse spectrum may be selected and other targets discriminated against in this fashion. The filtered IF signal is rectified by diode 903 to generate a video pulse train (See FIG. 10 curve A).

The video pulse train is applied to two range synchronous detectors 902 and 914. The purpose of the detectors is to select targets within the ranges of interest. Detector 914 multiplies the detected video pulse train with a range gate signal from range gate generator 916. The output signal from detector 914 is integrated in integrator 923 and amplified by DC amplifier 918 and the resultant DC signal is applied to modulation oscillator 924 to control the frequency of the modulating pulse train from the modulation oscillator 924.

Figure 11:
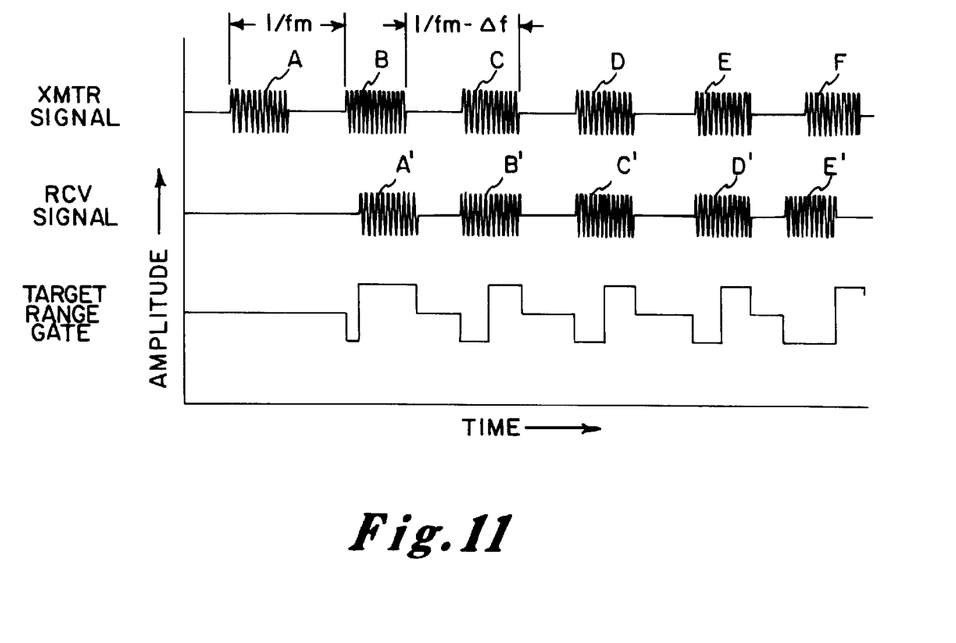

The modulating pulse train is applied to modulator 925 along with the CW carrier signal from master oscillator 926 where the carrier is amplitude modulated to produce a train of transmitter pulses, (as shown in the curve of FIG. 11a labelled XMTR signal), which are amplified in power amplifier 927 and coupled to duplexer 14 of FIG. 1.

The output of the modulation oscillator 924 is also applied to the range gate generator 916 to generate a range gate signal. The range gate signal is an "early-late" gate signal having a negative to positive transition in which the transition is centered at the predetermined range of interest for a given predetermined frequency of modulation.

Thus, when the range gate is multiplied by the pulse train, a zero signal is produced at the integrator 923 when the return signal from the target aligns with the second pulse transmitted.

As shown in the curve labelled RCV signal of FIG. 11, if return pulse B' aligns with the third transmitted pulse B, a zero signal is generated from integrator 923. A late pulse A' produces a primarily positive voltage amplitude signal A" (curve labelled Null Range Gate) from integrator 923. Conversely, a late pulse E' produces a previously negative voltage output. The integrated output can thus be used to lock the modulation oscillator frequency to bring the signal pulse train into alignment at the desired range.

Figure 10:
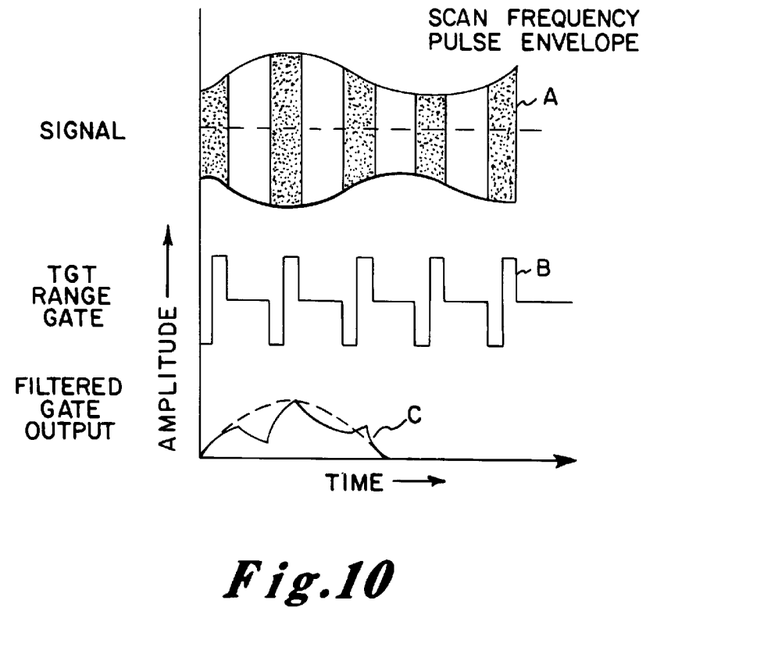
FIGS. 10 and 11 are plots of amplitude versus time for various signals from units in FIGS. 1 and 9.

Once aligned, the range gate generator signal is also used to multiply the video pulse train from rectifier 903 in monopulse detector 902. The output of detector 902 is a predominantly positive or negative pulse train depending upon the differential amplitude of the signal pulse (FIG. 10, signal curve A) across the target range gate duration (FIG. 10, Tgt Range Gate, curve B).

The output pulse train from detector 902 is coupled to scan frequency filter 904. This filter is centered at the scan frequency $F_s$ and generates a scan frequency signal output proportional in amplitude and phase to the pulse train input (FIG. 10, Filtered Gate Output, curve C). The output of scan filter 904 is amplified in scan error amplifier 906 and applied to scan synchronous detector 908 where it is multiplied by the reference scan frequency from oscillator 950. The output of the detector 908 is positive if the scan frequency out of amplifier 906 is in phase with the scan frequency from oscillator 950. Conversely, the output is negative if an out of phase condition is present. The output of the scan synchronous detector is the monopulse error signal (See FIG. 4 in which + or − voltages occur, depending upon the percent of modulation). The monopulse error signal is amplified in amplifier 910 and applied to a monopulse threshold gate 912 where it is compared with a reference voltage of known magnitude and polarity. A command signal is generated when the error signal exceeds the threshold reference voltage $V_r$.

Two Channel Superheterodyne Gimballed Embodiment

Figure 7:
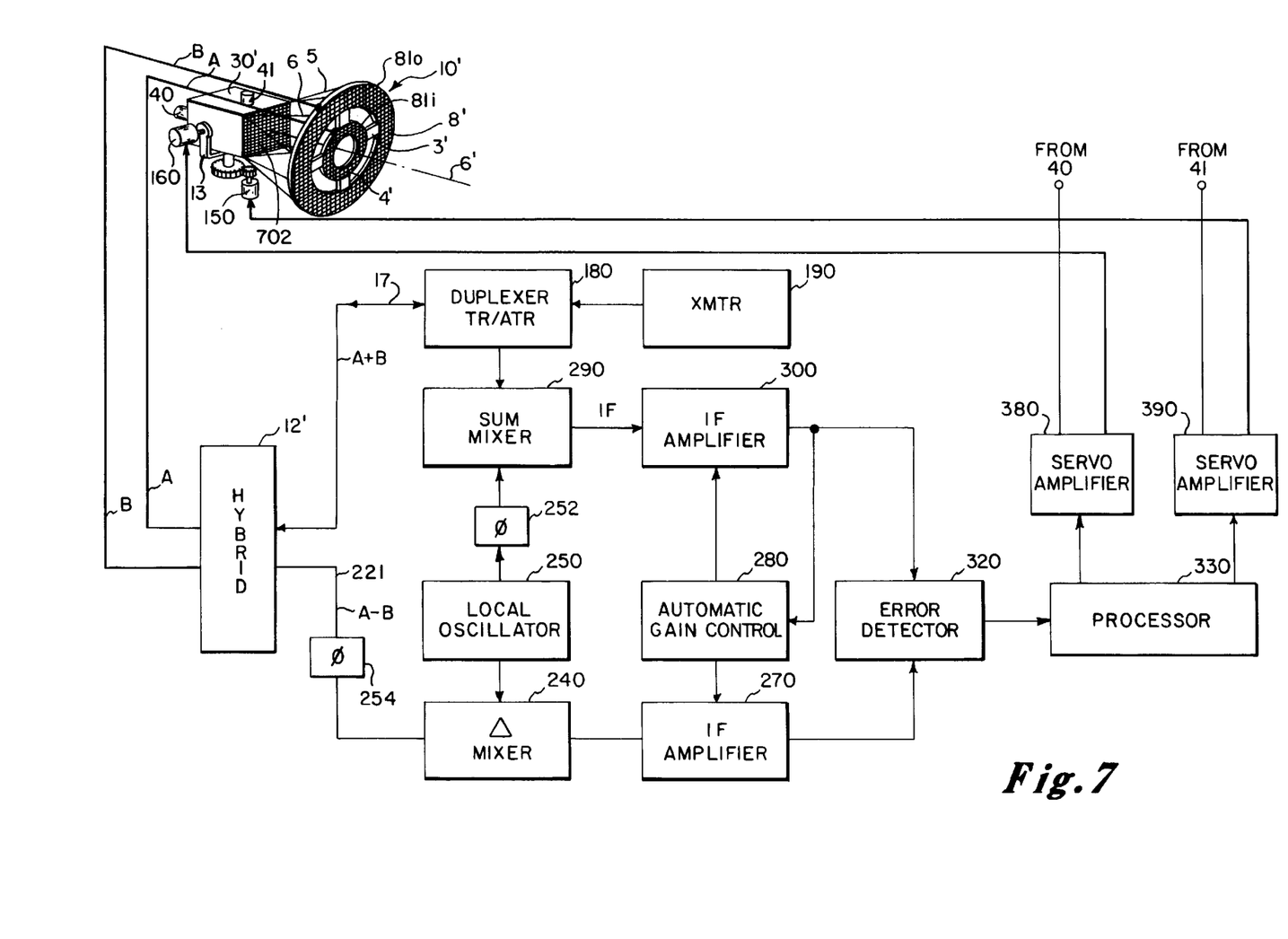
FIG. 7 is a block diagram of an alternate embodiment of the invention.

FIG. 7 illustrates the functional relationships of electronic components required in an alternative cylindrical monopulse implementation utilizing a superheterodyne receiver and independent angular positioning of the weapons system/sensor assembly with respect to the weapons system platform.

In this an alternate embodiment, the monopulse antenna is space fed and operated in a search mode. The inner and outer annuli 4' and 8' are rigidly supported by struts 3 and 5 and held in a fixed position with respect to radiant feed horns 702 on corporate structure 30'. The inner and outer annuli are disposed symmetric to and coaxial to the weapon system beam axis 6'.

Figure 8A:
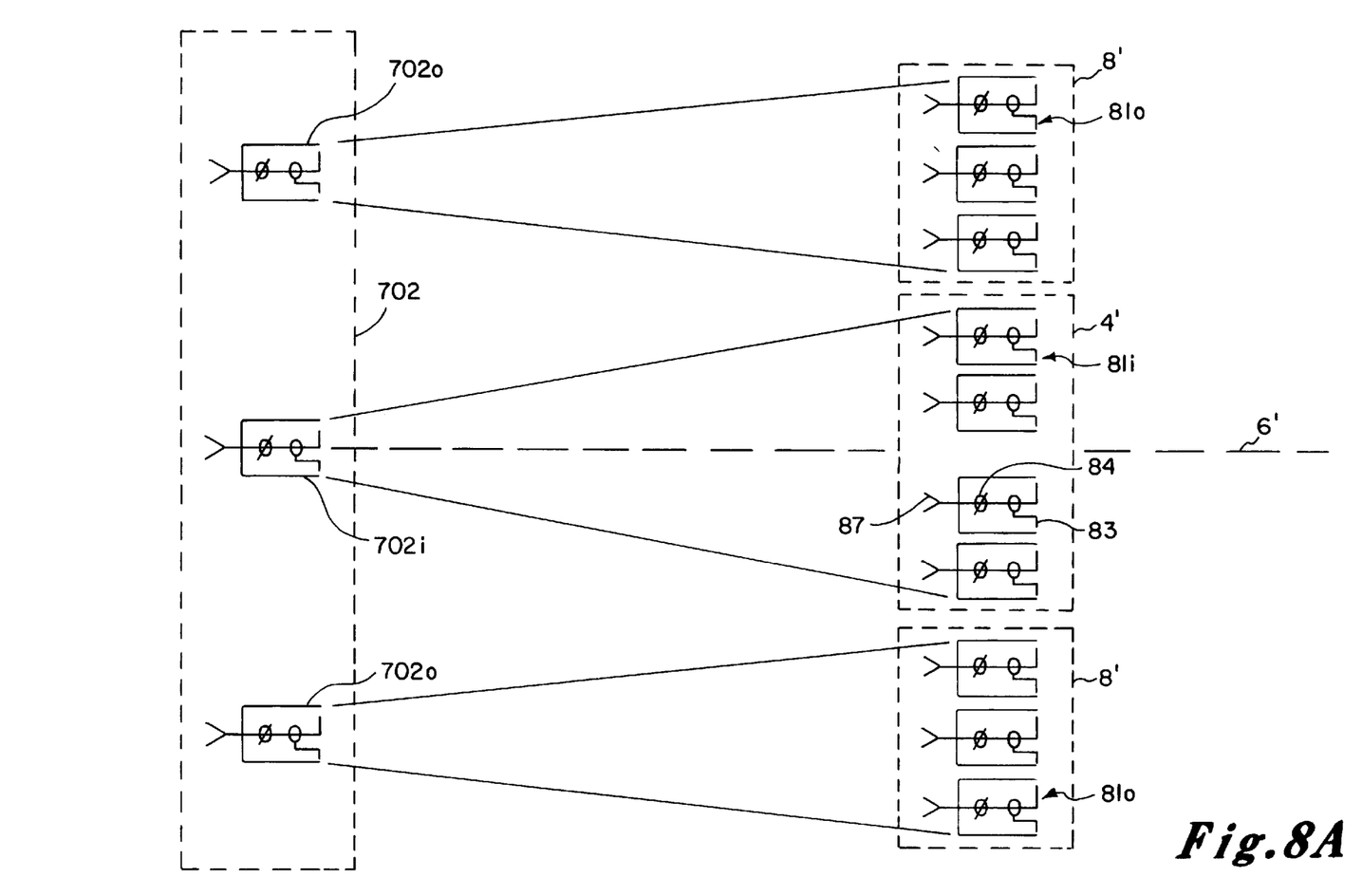
FIG. 8 is a schematic of the antenna and feed structure utilized in FIG. 7.

Each of the annular antenna elements 81i and 81o are shown schematically in FIG. 8A to comprise a lens structure of an array of inner 81i and outer 81o feed/radiating elements consisting of a radiating dipole 83 coupled to an adjustable phase shifter 84 and a feed element 87.

The inner annulus array 4' is fed from one or more radiating horns 702i. The outer annulus array 8' is fed power from radiating horns 702o which provide a uniform beam pattern across the face of the annuli array.

Figure 8B:
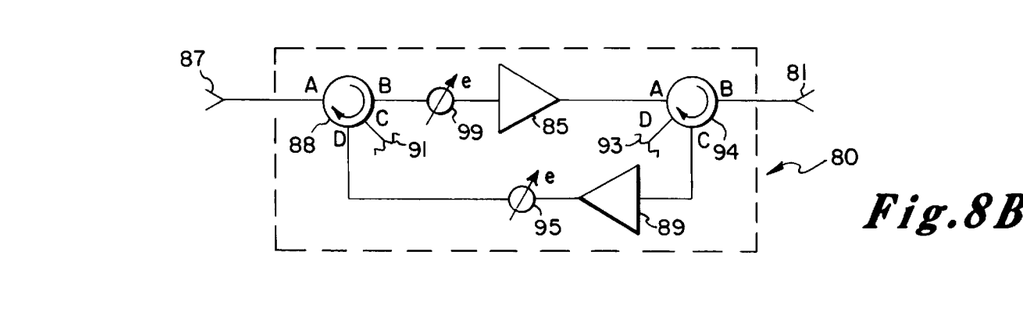

In the system of FIG. 8B, the power incident on the rear antenna elements 87 of the active lens assembly 80 is conducted to port "a" of the rear circulator 88. The action of the circulator conducts the illumination power to port "b", where it is conducted to the transmit phase shifter 99. Any reflected power from the transmit phase shifter/transmit power amplifier combination is conducted from port "b" of the rear circulator to a dummy load 91 at port "c". The net (incident-reflected) illumination power is amplified by the power amplifier 85 and amplified to port "a" of the forward, or transmit, circulator 84. Again, by the nature of the device, the power applied to port "a" is conducted to port "b" and out to the prime antenna element 81. Any power received from space is conducted from the element 81 to port "b" of the circulator 94, is conducted through the circulator to port "c", and amplified to the receiver preamplifier 89. The output of the preamplifier is amplified to port "d" of the rear circulator 88. The circulator directs the received signal to port "a" and the rear antenna element 87 where it is radiated back to the primary feed (not shown). In some cases, it may be desirable to replace the rear circulator 88 by polarization duplexing, whereby the rear element uses different polarities for transmit and receive transmission with corresponding polarization of the primary feed assembly.

Referring back to FIG. 7; the transmitter 190 feeds an RF transmit signal into a duplexer TR/ATR device 180 coupled by coaxial feed 17 to the sum port of antenna feed hybrid 12'. The hybrid 12' divides the transmitted signal into equal amplitude and phase A and B signals which are fed to the inner and outer feeds 702i and 702o (FIG. 8A) for concentric inner and outer antenna arrays 4' and 8' in the antenna 10' through the backup structure 30'. The receive signal is coupled back the reverse path and hybrid 12' generates vector sum (A+B) and vector difference (A−B) signals. The sum signal is duplexed in duplexer 180 and coupled to sum mixer 290. The difference signal (A−B) is coupled to the difference mixer 240 through variable phase circuit 254 which is used in initially calibrating the system to adjust for any time delay between the circuit paths of the A+B and A−B signal. A local oscillator 250 provides a relatively low frequency signal of appropriate phase such that the IF signal from mixer 240 into the IF amplifier 270 will be in phase or in quadrature, depending on whether amplitude or frequency modulation is utilized in the IF amplifiers 270 and 300.

The IF amplifier 300 in the sum channel develops an IF signal which is detected to provide AGC error to the automatic gain control 280 of the difference IF amplifier 270. Amplifier 270 is slaved to the sum channel so that the error signals are normalized into the error detector 320 with the sum signal controlling their normalization. The error detector 320 comprises quadrature synchronous detectors to allow the determination of the phase and amplitude of the difference signal with respect to the sum signal. The quadrature synchronous detector output from detector 320 is either a plus or minus signal indicating whether a target is within the null (+) or outside of the null (−). The magnitude of the signal from the in-phase detector is a measure of radial distance from the null. Using this information, the processor 330 generates a fire signal.

Additionally, the error signal out of the processor 330 may be coupled to the servo amplifiers 380 and 390 in which case the servos 160 and 150 would then move the corporate structure 30 to describe a circle of precession. This tends to bring the boresight 6' into a more optimal alignment with the target.

Generalized Antenna Relationships

While the preferred embodiments of the monopulse antenna thus described are annular in shape, it is also contemplated that other shapes may be utilized in accordance with the invention, provided symmetry about the boresight axis is retained in two dimensions. Such an alternate embodiment will now be described in connection with FIGS. 12, 13 and 14. Additionally, some of the physical parameters of the general antenna system will now be defined in connection with these figures.

Figure 12:
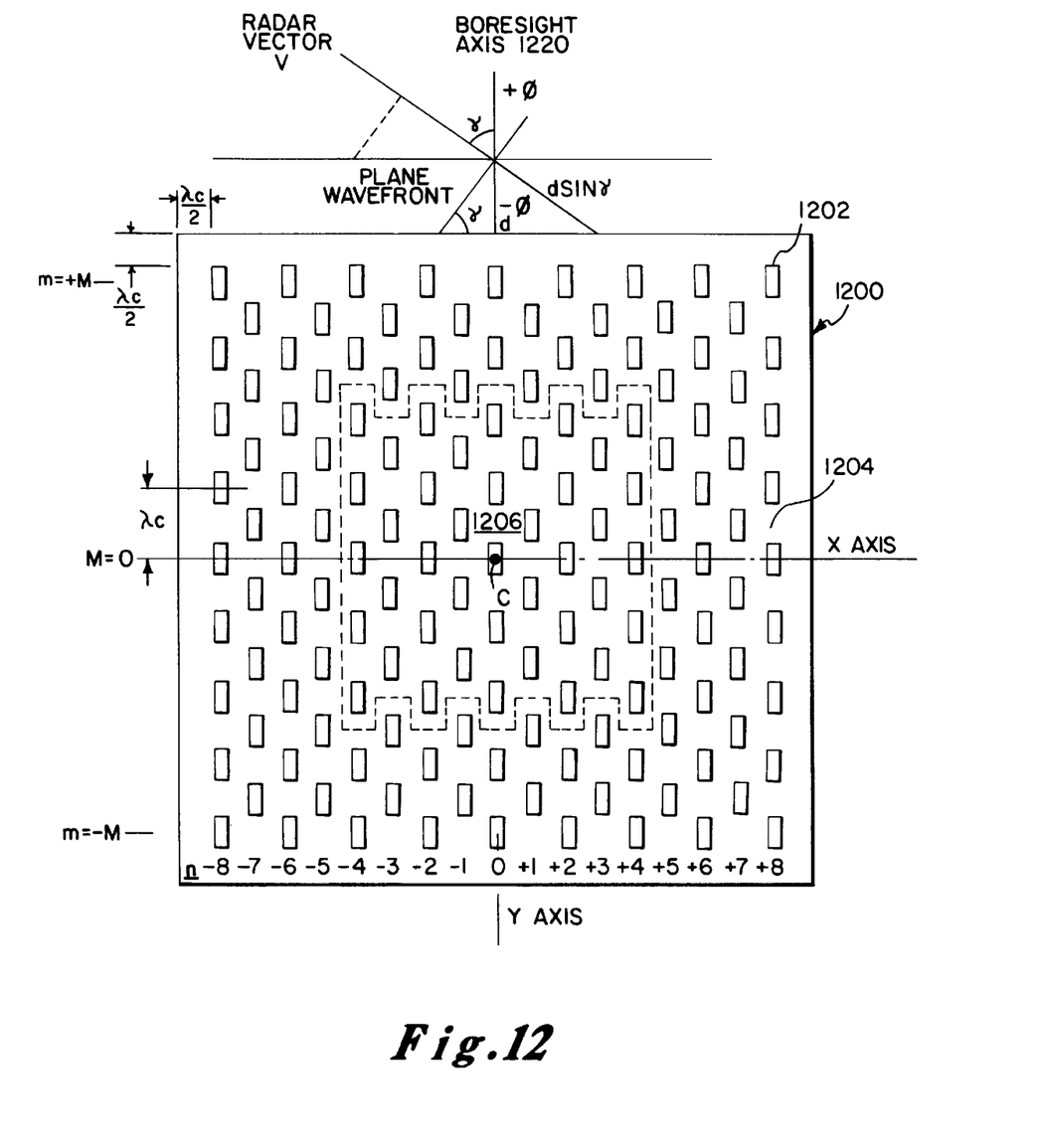
FIG. 12 is a schematic representation of a non-annular version of the invention.

FIG. 12 depicts an array 1200 of m rows and n columns of radiating elements symmetrically disposed about a boresight axis 1220 normal to the array and passing through the center point of the array C. In this case, n=8 elements 1202 four to the left of the Y axis and four elements to the right of the Y axis and one element on the Y axis for a total of 17 elements. Similarly, 9 m elements are provided, 4 above and 4 below and one on the X axis.

By analogy to the previous embodiments, the elements within dotted line 1208 may be considered to form the inner antenna array 1206 and the elements outside the dotted line form the outer antenna array 1204.

Figure 13:
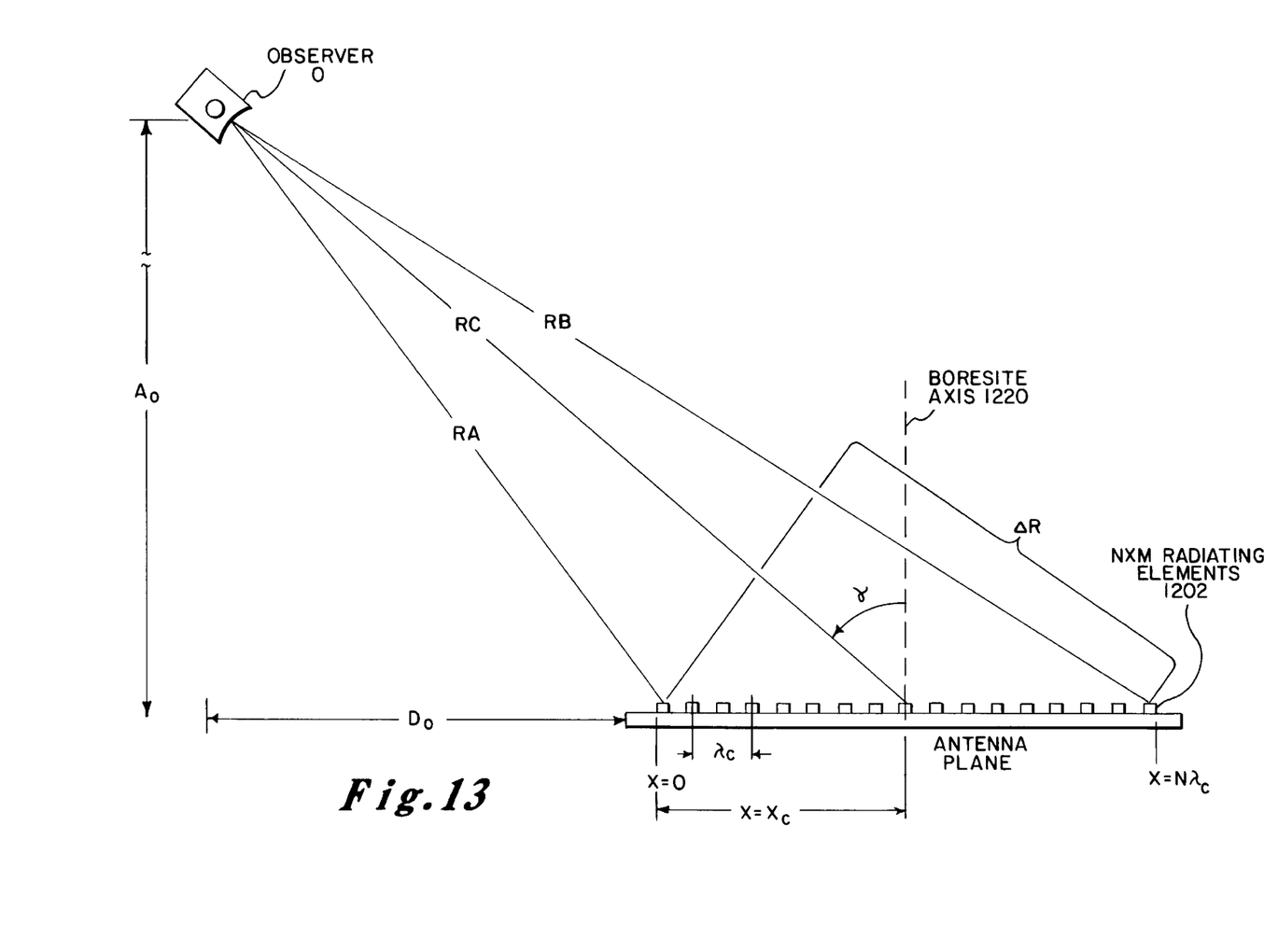
FIG. 13 is a schematic representation of the range and angle parameters considered in connection with the FIG. 12 embodiment.
Figure 14:
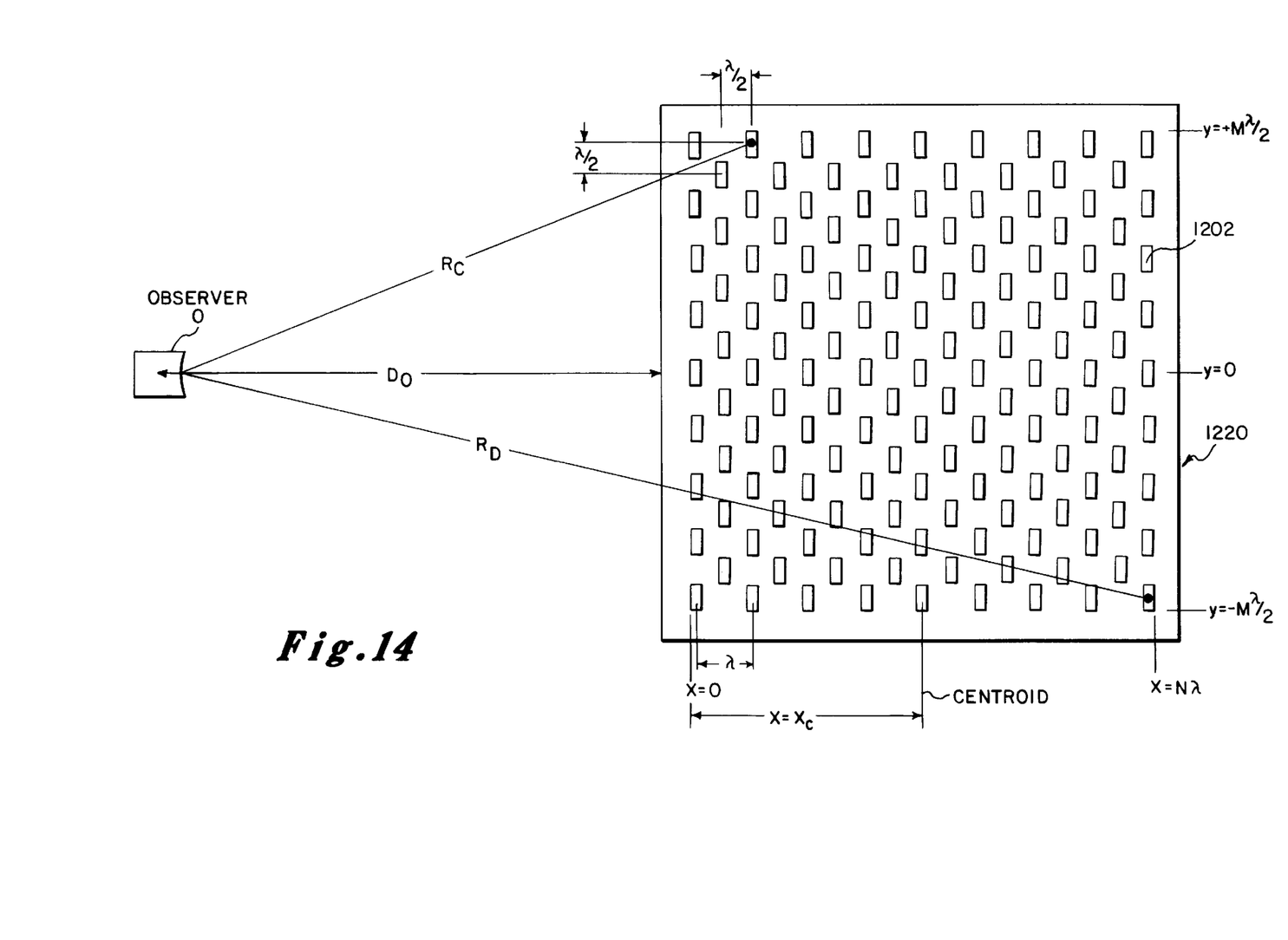
FIG. 14 is a schematic illustration used in connection with the computation of the eigenvalues for the FIG. 12 embodiment.

FIG. 13 is a side view of the antenna of FIG. 12 showing the trigonometric relation of the antenna elements with respect to a stationary observer "0" located at the far field of the antenna and FIG. 14 is a front view of the antenna of FIG. 12, showing the same relationship from the front perspective.

As a plane wave arrives along the radar vector V plane, it will progress across the array along the m=0 or X axis. As it does so, each column of elements at a common n-column address is illuminated by the same phase.

Since the distance d between each column address is by definition $\lambda c/2$ (wherein $\lambda c$=wavelength of carrier), the eigenvalues produced in each element along an m axis can be defined by Equation 1 below:

$$e(t) = A\cos\left[w_c t - \frac{n2\pi fc}{c}\left(\frac{\lambda c}{2}\sin\gamma\right)\right] \quad \text{Equation 1}$$

where $\gamma$ is the angle off boresight $$\frac{2\pi fc}{c} = \frac{2\pi}{\lambda c} = \text{spatial phase constant}$$

$n$ = the column address of the element which reduces to:

$$e(t) = A\cos[w_c t - n\pi\sin\gamma] \quad \text{Equation 2}$$

Expanding this Equation 2 by trigonometry provides:

$$e(t) = A\cos w_c t \cos(n\pi\sin\gamma) + \sin w_c t \sin(n\pi\sin\gamma) \quad \text{Equation 3}$$

This indicates a solution to the antenna pattern by the mathematical form of Bessel functions. Bessel functions provide the distribution of signals between the carrier and the harmonic phase functions for any given modulus. The modulus in this case is $(n\pi\sin\gamma)$ and the harmonic functions are $\cos(w_c t - n\phi)$, where $\phi$ is the phase of each element along the row m dependent on $\gamma$.

Using Bessel function patterns, the actual form of the inner (A) and outer (B) signals can be generated. Based upon such generation, it can be shown to first order that the outer rectangular array 1204 and the inner rectangular array 1206 provide a summation of signals to the respective feeds as follows:

| Equation 4 | Equation 5 |
| --- | --- |
| $e_1$ (t) [outer] = | $e_2$ (t) [inner] = |
| 9Acos ($w_c t + 8\pi \sin$ ) | 5Acos ($w_c t + 4 \sin$ ) |
| +8Acos ($w_c t + 7\pi \sin$ ) | +4Acos ($w_c t + 3 \sin$ ) |
| +9Acos ($w_c t + 6\pi \sin$ ) | +5Acos ($w_c t + 2 \sin$ ) |
| +8Acos ($w_c t + 5\pi \sin$ ) | +4Acos ($w_c t + \sin$ ) |
| +4Acos ($w_c t + 4\pi \sin$ ) | +5Acos ($w_c t$) |
| +4Acos ($w_c t + 3\pi \sin$ ) | +4Acos ($w_c t - \sin$ ) |
| +4Acos ($w_c t + 2\pi \sin$ ) | +5Acos ($w_c t - 2 \sin$ ) |
| +4Acos ($w_c t + \pi \sin$ ) | +5Acos ($w_c t - 3 \sin$ ) |
| +4Acos ($w_c t$) | +5Acos ($w_c t - 4 \sin$ ) |
| +4Acos ($w_c t - \pi \sin$ ) | |
| +4Acos ($w_c t - 2\pi \sin$ ) | |
| +4Acos ($w_c t - 3\pi \sin$ ) | |
| +4Acos ($w_c t - 4\pi \sin$ ) | |
| +8Acos ($w_c t - 5\pi \sin$ ) | |
| +9Acos ($w_c t - 6\pi \sin$ ) | |
| +8Acos ($w_c t - 7\pi \sin$ ) | |
| +9Acos ($w_c t - 8\pi \sin$ ) | |

From Equations 4 and 5, the difference ($\Delta$) and sum ($\Sigma$) expressions can be derived (Note that $\Delta$=outer-inner):

| Equation 6 $\delta$ (t) = | Equation 7 $\sigma$ (t) = |
| --- | --- |
| 9Acos ($w_c t + 8\pi \sin\gamma$) | 9Acos ($w_c t + 8\pi \sin\gamma$) |
| +8Acos ($w_c t + 7\pi \sin\gamma$) | +8Acos ($w_c t + 7\pi \sin\gamma$) |
| +9Acos ($w_c t + 6\pi \sin\gamma$) | +9Acos ($w_c t + 6\pi \sin\gamma$) |
| +8Acos ($w_c t + 5\pi \sin\gamma$) | +8Acos ($w_c t + 5\pi \sin\gamma$) |
| −Acos ($w_c t + 4\pi \sin\gamma$) | +9Acos ($w_c t + 4\pi \sin\gamma$) |
| −Acos ($w_c t + 2\pi \sin\gamma$) | +8Acos ($w_c t + 3\pi \sin\gamma$) |
| −Acos ($w_c t$) | +9Acos ($w_c t + 2\pi \sin\gamma$) |
| −Acos ($w_c t - 2\pi \sin\gamma$) | +8Acos ($w_c t + \pi \sin\gamma$) |
| −Acos ($w_c t - 4\pi \sin\gamma$) | +9Acos ($w_c t$) |
| +8Acos ($w_c t - 5\pi \sin\gamma$) | +8Acos ($w_c t - \pi \sin\gamma$) |
| +9Acos ($w_c t - 6\pi \sin\gamma$) | +9Acos ($w_c t - 2\pi \sin\gamma$) |
| +8Acos ($w_c t - 7\pi \sin\gamma$) | +8Acos ($w_c t - 3\pi \sin\gamma$) |
| +9Acos ($w_c t - 8\pi \sin\gamma$) | +9Acos ($w_c t - 4\pi \sin\gamma$) |
| | +8Acos ($w_c t - 5\pi \sin\gamma$) |
| | +9Acos ($w_c t - 6\pi \sin\gamma$) |
| | +8Acos ($w_c t - 7\pi \sin\gamma$) |
| | +9Acos ($w_c t - 8\pi \sin\gamma$) | wherein $\delta$=difference pattern and $\sigma$=sum pattern.

The first order patterns, neglecting the individual element gains, is found by vectorial addition of these terms across $\gamma$. At boresight, for instance, the phase term vanishes and the magnitude of the carrier can simply be calculated by arithmetic addition:

$$e_1^{(t)}\text{boresight}=104A \cos w_c t=20 \log 104=(40.34 \text{ dB}) \quad \text{Equation 8}$$

$$e_2^{(t)}\text{boresight}=41A \cos w_c t=20 \log 41=(32.12 \text{ dB}) \quad \text{Equation 9}$$

$$\delta^{(t)}\text{boresight}=63A \cos w_c t=20 \log 63=(35.987 \text{ dB}) \quad \text{Equation 10}$$

$$\sigma^{(t)}\text{boresight}=145A \cos w_c t=20 \log 145=(43.227 \text{ dB}) \quad \text{Equation 11}$$

It should be noted that Equations 4 and 5 represent only a first order pattern, without consideration of losses, parasitic effects and other difficulties encountered in implementation, but it does indicate the general effect of the summation and subtraction of the two beam patterns and is consistent with the measured data for an annular array shown in FIGS. 2 and 3. For the boresight condition, the scan frequency ($f_s$) modulation, which is the output of sensor 16 of FIG. 1, on the $\Delta$ signal can be calculated by amplitude modulating Equation 10:

$$\text{Modulated } \delta(t) = \delta_m(t) = (\cos w_s t)\, 63A \cos w_c t \qquad \text{Equation 12}$$

where $w_s = 2\pi f_s$ = scan radian frequency and the modulation index of 1 indicates suppressed carrier modulation:

$$= \frac{63A}{2}[\cos(w_c - w_s)t + \cos(w_{cY+ws})t]$$

where all energy is in the product sidebands.

This scan frequency modulated signal is added to the sum signal (Equation 11) in summer 18 to provide the dynamic scanning signal (s(t) into the mixer 20 of FIG. 1:

$$s(t) = \delta m^{(t)} + \sigma(t) = (\cos w_s t) + 145A \cos w_c t \qquad \text{Equation 13}$$

The peaks of this signal occurs when cos $w_c t$ is at +1, providing:

$$s(t)_{peak} = 63A \cos w_c t + 145A \cos w_c t = 208A \cos w_c t \qquad \text{Equation 14}$$

The valley, or minimum, occurs when cos $w_s t$ is at −1, providing:

$$s^{(t)}\text{valley} = 145A \cos w_c t - 63A \cos w_c t = 82A \cos w_c t. \qquad \text{Equation 15}$$

The percent modulation (mi) for the signal of Equation 13 is defined as:

$$m_i = \frac{Emax - Emean}{Emean} = \frac{208 - 145}{145} = 43.4 \text{ percent} \qquad \text{Equation 16}$$

The recovered modulation, taken from the processed intermediate frequency signal by amplitude detector will be in phase with the scan frequency signal and is therefore defined as positive.

Equivalents

This completes the description of the preferred embodiment of the invention. Those skilled in the art will realize that it can be varied in many ways, as is apparent in the above-description. The invention should therefore only be limited insofar as is required by the scope of the following claims.

What is claimed is:

1. A monopulse radar system comprising:
   a) an inner antenna and
   b) an outer antenna
   c) each antenna being symmetrically disposed about a line of symmetry extending through the center of said inner antenna;
   d) said inner and outer antennas adapted to receive respective signals A and B from targets which are off the line of symmetry, said inner antenna further having a central opening at the line of symmetry;
   e) hybrid means coupled to said antennas for providing sum and difference signals from said received signals;
   f) means for determining the target angle off the line of symmetry from said sum and difference signals; and
   g) a weapon system is positioned on one side of the opening in the inner antenna along the line of symmetry.

2. The system of claim 1 in which a transmitter is coupled to said hybrid means, said transmitter generating a sum signal which is divided in said hybrid to an A signal which is coupled to said outer antenna and a B signal which is coupled to said inner antenna.

3. The system of claim 1 in which the antennas are circular in shape.

4. The system of claim 1 in which the antennas are circular in shape.

5. A monopulse radar system comprising:
   a) an inner antenna and
   b) an outer antenna
   c) each antenna being symmetrically disposed about a line of symmetry extending through the center of said inner antenna;
   d) a transmitter means for generating a train of CW pulses which are simultaneously coupled to said inner and outer antenna and radiated therefrom;
   e) said inner and outer antennas adapted to receive respective return signals A and B reflected from targets which are off the line of symmetry, said inner antenna further having a central opening at the line of symmetry;
   f) hybrid means coupled to said antennas for providing sum and difference signals from said received signals;
   g) receiver means for determining the angle of the target off the line of symmetry from said sum and difference signals; and
   h) a weapon system is positioned on one side of the opening in the inner antenna along the line of symmetry.

6. The radar of claim 5 further including means in said receiver for modulating the difference signal with a sinusoidal scanning frequency signal to produce a suppressed carrier amplitude modulated signal with an alternating phase at the half cycles of the scan frequency signal.

7. The radar of claim 5 further including in said receiver range gating means for selecting for further processing certain return signals located within a predetermined range from the antennas.

8. The antenna system of claim 5 wherein the inner and outer antennas comprise a plurality of radiating elements.

9. The antenna system of claim 5 wherein the antenna radiating elements are formed in four quadrants per inner and outer antenna which are coupled at one point per antenna.

10. The antenna system of claim 5 wherein the antennas are coupled to an RF power transmitter and to a receiver.

11. The system of claim 10 wherein RF power from the transmitter is propagated through space to the receiver.

12. The system of claim 10 wherein the receiver is a homodyne receiver.

* * * * *